(12) United States Patent
Kimura et al.

(10) Patent No.: US 10,094,685 B2
(45) Date of Patent: Oct. 9, 2018

(54) DISPLACEMENT ENCODER

(71) Applicant: MITUTOYO CORPORATION, Kanagawa (JP)

(72) Inventors: Akihide Kimura, Saitama (JP); Joseph Daniel Tobiason, Woodinville, WA (US)

(73) Assignee: MITUTOYO CORPORATION, Kanagawa (JP)

( * ) Notice: Subject to any disclaimer, the term of this patent is extended or adjusted under 35 U.S.C. 154(b) by 142 days.

(21) Appl. No.: 15/391,243

(22) Filed: Dec. 27, 2016

(65) Prior Publication Data

US 2018/0180453 A1    Jun. 28, 2018

(51) Int. Cl.
*G01D 5/34* (2006.01)
*G01D 5/347* (2006.01)

(52) U.S. Cl.
CPC .............. *G01D 5/34746* (2013.01)

(58) Field of Classification Search
CPC .. G01D 5/347; G01D 5/34707; G01D 5/3473; G01D 5/34746
USPC ............ 250/237 G, 231.13, 231.14, 231.16, 250/231.18; 356/499, 521
See application file for complete search history.

(56) References Cited

U.S. PATENT DOCUMENTS

| | | | |
|---|---|---|---|
| 5,249,032 A | 9/1993 | Matsui et al. | |
| 7,480,060 B2 * | 1/2009 | Goldman | G01D 5/38 250/237 G |
| 2004/0090637 A1 | 5/2004 | Holzapfel et al. | |
| 2007/0102630 A1 * | 5/2007 | Igaki | G01D 5/38 250/231.16 |
| 2018/0087931 A1 * | 3/2018 | Laman | G01D 5/34707 |

FOREIGN PATENT DOCUMENTS

| JP | 2619566 | 6/1997 |
|---|---|---|
| JP | 4856844 | 1/2012 |

OTHER PUBLICATIONS

Hane et al., "Optical Encoder Using Metallic Surface Grating", Journal of the Japan Society for Precision Engineering, vol. 64., No. 10, Oct. 5, 1998, pp. 1532-1536 with a partial English translation.

* cited by examiner

*Primary Examiner* — Kevin Pyo
(74) *Attorney, Agent, or Firm* — Greenblum & Bernstein, P.L.C.

(57) ABSTRACT

A detection head movable relative to a scale detects diffracted light and outputs a detection result. The diffracted light is diffracted by an incremental pattern. A signal processing unit calculates a relative displacement between the scale and the detection head. The detection head includes: a light source emitting the light to the scale; and a detection unit including a light-receiving unit in which a plurality of light-receiving elements that output a detection signal are arranged. The number of the plurality of light-receiving elements is an even number. A period of the arrangement of the plurality of light-receiving elements is an odd-number multiple of a fundamental period. The fundamental period is a period of interference fringes formed on the light-receiving unit by +1st and −1st order diffracted lights. A width of the light-receiving element is not equal to an integral multiple of the fundamental period.

14 Claims, 16 Drawing Sheets

DISPLACEMENT ENCODER

BACKGROUND OF THE INVENTION

1. Field of the Invention

The present invention relates to a displacement encoder.

2. Description of Related Art

Currently, as a type of an apparatus for measuring a displacement, an optical displacement encoder is known. The optical displacement encoder includes a scale and a detection head that moves along the scale. The scale is provided with, for example, an absolute pattern for detecting a reference position and an incremental pattern for detecting a relative displacement between the scale and the detection head. The optical displacement encoder determines the reference position by using a reference signal which is a result of the detection of the absolute pattern on the scale. Further, a positional relation between the scale and the detection head can be detected by taking account of (i.e., can be detected based on) a displacement relative to the reference position obtained from a detection result of the incremental pattern.

In general, the incremental pattern is formed as a diffraction grating in which a plurality of grating patterns are arranged in a measurement direction. Light is applied (i.e., emitted) to this diffraction grating and an optical intensity of interference fringes that are formed by interference between +1st order diffracted light and −1st order diffracted light diffracted by the diffraction grating is detected.

In this type of optical displacement encoder, in order to accurately detect interference fringes between the +1st order and −1st order diffracted light, it is necessary to prevent or minimize the effect on the interference fringes caused by diffracted light having the other orders such as 0th order diffracted light.

For example, a displacement encoder in which 0th order diffracted light is removed by disposing an optical block between a light source and a scale has been proposed (Japanese Patent No. 2619566). In this displacement encoder, an index grating is interposed between the light source and the scale and light is applied from the light source to the index grating. A shield for blocking the 0th order diffracted light is interposed between the index grating and the scale. This shield is disposed in such a position that the 0th order diffracted light is blocked but the +1st order and −1st order diffracted light are not blocked. Therefore, while the +1st order and −1st order diffracted light reach the scale, the 0th order diffracted light does not reach the scale. As a result, only the +1st order and −1st order diffracted light travel from the scale to a detection unit, thus making it possible to prevent the effect of the 0th order diffracted light.

Further, another example of a displacement encoder using an index grating has been proposed (Japanese Patent No. 4856844). In this displacement encoder, light is applied from a light source to a scale and diffracted light that has passed through the scale is detected. An index grating is interposed between the scale and a detection unit. Further, a diffraction grating is formed (i.e., disposed) only in a place on which +1st order and −1st order diffracted light of the diffracted light coming from the scale are incident, so that the other orders of diffracted light including 0th order diffracted light are blocked. The +1st order and −1st order diffracted light incident on the index grating are diffracted by the diffraction grating and interference fringes are formed on the detection unit. In this way, only the +1st order and −1st order diffracted light travel from the scale to the detection unit, thus making it possible to prevent the effect of the 0th order diffracted light.

Further, a displacement encoder in which 0th order diffracted light is removed by using a spatial filter has been proposed (Kazuhiro Hane, others: 2, "Optical Encoder Using Metallic Surface Grating", Journal of the Japan Society for Precision Engineering, Vol. 64, No. 10, 1998). In this displacement encoder, laser light is applied to a scale and resultant diffracted light is collimated by a collimator lens. Then, a spatial filter in which a slit is disposed in such a place that only +1st order and −1st order diffracted light of the collimated diffracted light having various orders coming from the collimator lens pass therethrough is used, so that the other orders of diffracted light including 0th order diffracted light are blocked. After that, by converging the +1st order and −1st order diffracted light on a detection unit by a convergence lens, interference fringes can be formed on the detection unit.

SUMMARY OF THE INVENTION

However, there are the following problems in the above-described displacement encoders. As described above, it is necessary to add optical elements such as an index grating, a lens, and a spatial filter in order to remove the effect of 0th order diffracted light. As a result, the size of the displacement encoder would be increased and the structure thereof could become complicated.

Further, in all of the above-described examples, the +1st order and −1st order diffracted light are separated from the other orders of diffracted light by using a difference in the diffraction angle. Therefore, when diffracted light needs to be accurately separated, the distance between the optical elements needs to be increased, because the distance by which different orders of diffracted light are separated from each other could not otherwise be increased. Therefore, the size of the displacement encoder could be further increased.

The present invention has been made in view of the above-described circumstances and an object of the present invention is to provide a displacement encoder capable of improving position detection accuracy by removing unnecessary diffracted light.

A first exemplary aspect of the present invention is a displacement encoder including:

a scale with an incremental pattern formed therein;

a detection head movable relative to the scale in a measurement direction, the detection head being configured to detect diffracted light and output a detection result, the diffracted light being obtained by diffraction of light emitted to the scale by the incremental pattern; and a signal processing unit configured to calculate a relative displacement between the scale and the detection head based on the detection result obtained by the detection head, in which the detection head includes:

a light source configured to emit the light to the scale; and a detection unit including a light-receiving unit including
a plurality of light-receiving elements arranged in the measurement direction, the plurality of light-receiving elements being configured to output a detection signal of the diffracted light from the scale, the number of the plurality of light-receiving elements arranged in the measurement direction is an even number, a period of the arrangement of the plurality of light-receiving elements is an odd-number multiple of a fundamental period, the fundamental period being a period of interference fringes formed on the light-receiving unit by +1st order diffracted light and −1st order diffracted light of the diffracted light, and a width of the light-receiving element in the measurement direction is not equal to an integral multiple of the fundamental period.

A second exemplary aspect of the present invention is the above-described displacement encoder, in which the +1st order diffracted light, −1st order diffracted light, and 0th order diffracted light from the scale are incident on the detection unit.

A third exemplary aspect of the present invention is the above-described displacement encoder, in which a plurality of light-receiving units are arranged in the measurement direction in the detection unit, and among the plurality of light-receiving units, two light-receiving units adjacent to each other are shifted from each other by a distance equivalent to a quarter of the fundamental period so as to be apart from each other in the measurement direction.

A fourth exemplary aspect of the present invention is the above-described displacement encoder, in which first and second light-receiving units are arranged in this order in the measurement direction in the detection unit, and the detection unit outputs a detection signal output from the first light-receiving unit to the signal processing unit as an A phase signal and outputs a detection signal output from the second light-receiving unit to the signal processing unit as a B phase signal.

A fifth exemplary aspect of the present invention is the above-described displacement encoder, in which first, second, third and fourth light-receiving units are arranged in this order in the measurement direction in the detection unit, and the detection unit outputs a differential A phase signal and a differential B phase signal to the signal processing unit, the differential A phase signal being a differential signal between an A phase signal and an A− phase signal, the differential B phase signal being a differential signal between a B phase signal and a B− phase signal, the A phase signal being a detection signal output from the first detection unit, the A− phase signal being a detection signal output from the third detection unit, the B phase signal being a detection signal output from the second detection unit, the B− phase signal being a detection signal output from the fourth detection unit.

A sixth exemplary aspect of the present invention is the above-described displacement encoder, in which a plurality of light-receiving units are arranged in the measurement direction in the detection unit, and among the plurality of light-receiving units, two light-receiving units adjacent to each other are shifted from each other by a distance equivalent to one third of the fundamental period so as to be apart from each other in the measurement direction.

A seventh exemplary aspect of the present invention is the above-described displacement encoder, in which first, second and third light-receiving units are arranged in this order in the measurement direction in the detection unit, and the detection unit outputs a differential A phase signal and a differential B phase signal to the signal processing unit, the differential A phase signal and the differential B phase signal being generated by combining an A phase signal, a B phase signal, and a C phase signal, and having phases different from each other by 90°, the A phase signal being a detection signal output from the first detection unit, the B phase signal being a detection signal output from the second detection unit, the C phase signal being a detection signal output from the third detection unit.

According to the present invention, it is possible to provide an displacement encoder capable of improving position detection accuracy by removing unnecessary diffracted light.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter with reference to the drawings.

The same symbols are assigned to the same components throughout the drawings, and their duplicated explanations are omitted as appropriate.

First Exemplary Embodiment

Figure 1:
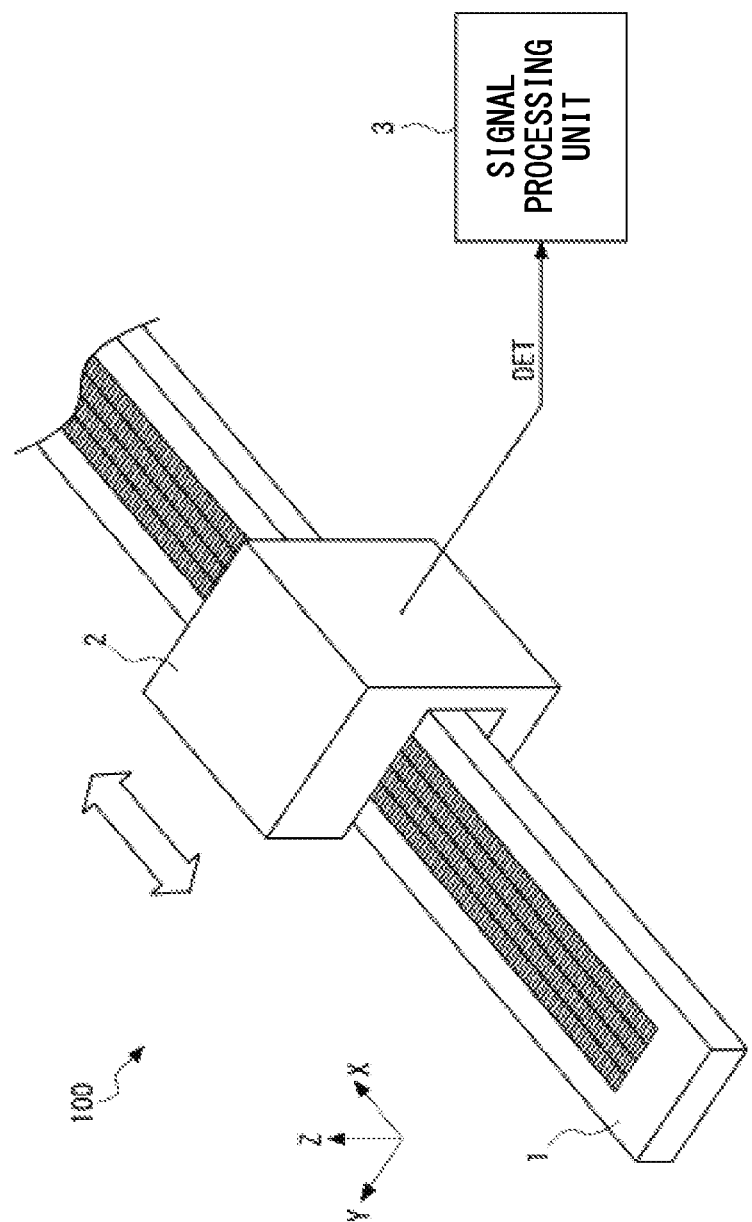
FIG. 1 is a perspective view showing a general configuration of an optical displacement encoder 100 according to a first exemplary embodiment.

An optical displacement encoder according to a first exemplary embodiment of the present invention is explained. FIG. 1 is a perspective view showing a general configuration of an optical displacement encoder 100 according to the first exemplary embodiment. An example case where the optical displacement encoder 100 is constructed as a transmission-type displacement encoder is explained hereinafter. As shown in FIG. 1, the optical displacement encoder 100 includes a scale 1, a detection head 2, and a signal processing unit 3. The scale 1 and the detection head 2 are configured so that they can be moved relative to each other along a measurement direction (an X-axis direction in FIG. 1) which is in parallel with the longitudinal direction of the scale 1. A pattern used for position detection is formed in the scale 1. When light is applied (i.e., emitted) to the pattern, interference light is generated. The detection head 2 detects a change in the interference light in the measurement direction and outputs a detection signal DET, which is an electric signal indicating the detection result, to the signal processing unit 3. The signal processing unit 3 performs signal processing on the received detection signal DET and thereby calculates a positional relation between the scale 1 and the detection head 2.

Note that a direction that is perpendicular to the measurement direction (the X-axis direction in FIG. 1) and in parallel with the width direction of the scale 1 is defined as a Y-axis direction in the following explanation. That is, the principal surface of the scale 1 is an X-Y plane (i.e., in parallel with an X-Y plane). Further, a direction that is perpendicular to the principal surface (the X-Y plane) of the scale 1, i.e., the direction that is perpendicular to both the X- and Y-axes is defined as a Z-axis direction. Further, in the below-explained perspective views, a direction from the lower-left corner toward the upper-right corner on the drawing is defined as a positive direction on the X-axis. A direction from the lower-right corner toward the upper-left corner on the drawing is defined as a positive direction on the Y-axis. Further, a direction from the bottom toward the top on the drawing is defined as a positive direction on the Z-axis.

Figure 2:
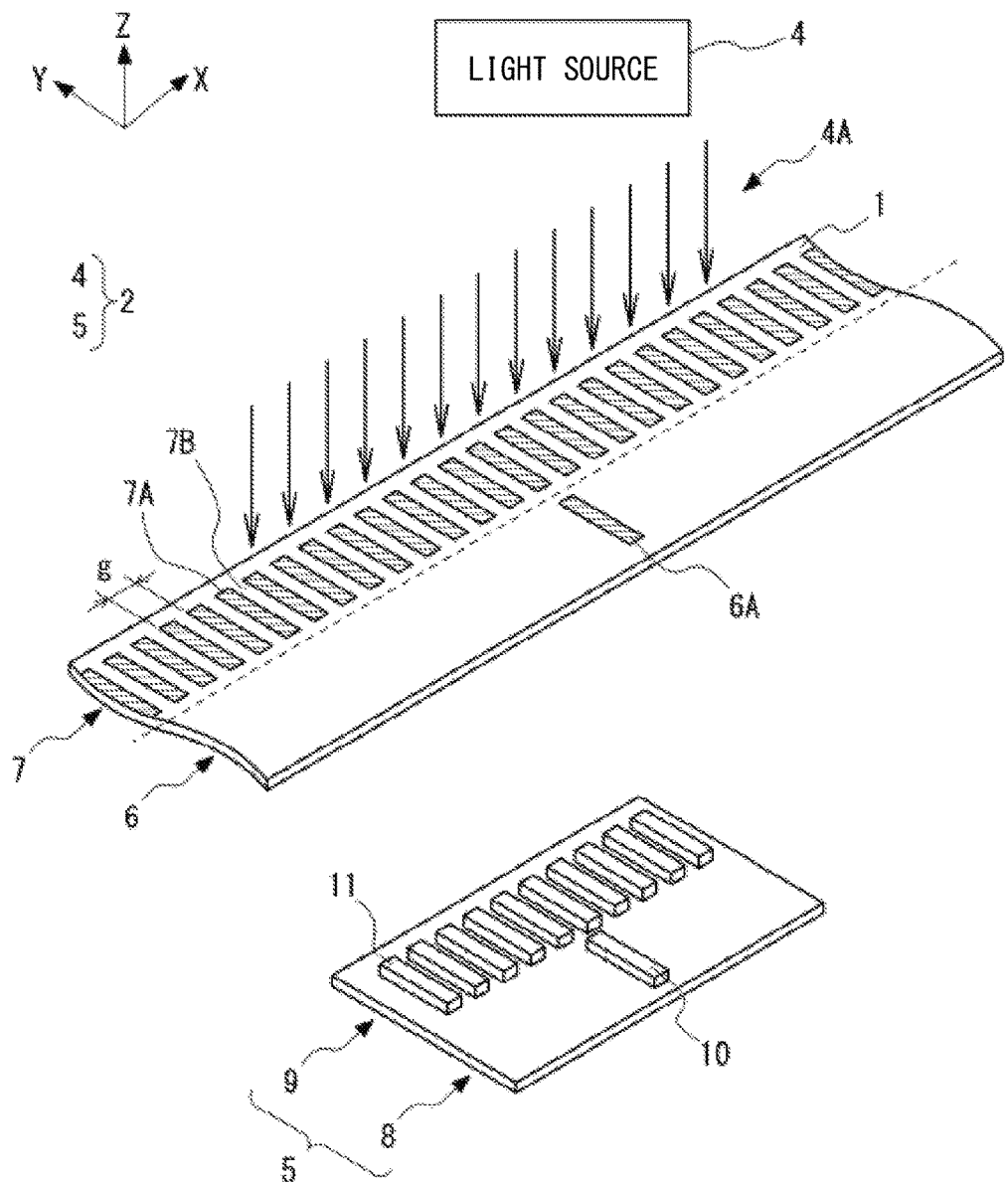
FIG. 2 is a perspective view showing a configuration of the optical displacement encoder 100 according to the first exemplary embodiment.

The optical displacement encoder 100 is explained hereinafter in a more detailed manner. FIG. 2 is a perspective view showing a configuration of the optical displacement encoder 100 according to the first exemplary embodiment. As shown in FIG. 2, the detection head 2 includes a light source 4 and a detection unit 5. As described above, the scale 1 and the detection head 2 are configured so that they can be moved relative to each other in the measurement direction (the X-axis direction in FIG. 2).

The light source 4 is a light source that outputs collimated light 4A. The light source 4 includes, for example, a light source element and a collimator. Light output from the light source is collimated by the collimator and thereby becomes the collimated light 4A. Examples of available light sources include an LED (Light Emitting Diode), a semiconductor laser, an SLED (Self-Scanning Light Emitting Device), and an OLED (Organic light-emitting diode). Further, as for the collimator, various collimating means such as a lens optical system can be used.

The scale 1 is formed as a plate member whose principal surface (the X-Y plane) is perpendicular to the Z-axis and whose longitudinal direction is in parallel with the X-axis direction in FIG. 2. The scale 1 is disposed in a place where the collimated light 4A from the light source 4 is incident on its principal surface (the X-Y plane) at a right angle. In FIG. 2, the scale 1 is disposed on the negative side in the Z-axis direction with respect to the light source 4.

A reference pattern 6 and an incremental pattern 7 are formed in the plate member constituting the scale 1.

As a typical example of the reference pattern 6, one light-transmitting part 6A having a grid-like shape (or a slender rectangular shape) whose longitudinal direction is in parallel with the Y-direction in FIG. 2 is formed. However, the pattern of the reference pattern 6 is not limited to this example. That is, other patterns such as one composed of a plurality of grid patterns can be used as appropriate.

As for the incremental pattern 7, a plurality of grid-like light-transmitting parts whose longitudinal direction is in parallel with the Y-direction in FIG. 2 are arranged in a row in the X-axis direction. That is, light-transmitting parts 7A and non-transmitting parts 7B are alternately and repeatedly arranged in the X-axis direction with a pitch g in the incremental pattern 7.

The scale 1 is preferably formed of glass. In such a case, non-transmitting parts are formed by a metallic film that is vapor-deposited on the glass and areas where no metallic film is formed serve as light-transmitting parts. However, any material from which grid-like light-transmitting parts, which let light pass therethrough, and non-transmitting parts, which do not let light pass therethrough, can be formed can be used as the material for the scale 1.

The detection unit 5 is configured so that it can detect light that has passed through the scale 1. The detection unit 5 includes light-receiving units 8 and 9. The light-receiving units 8 and 9 are arranged side by side in the Y-axis direction. The detection unit 5 outputs signals output by the light-receiving units 8 and 9 as a detection signal DET.

The light-receiving unit 8 is configured so that it can detect light that has passed through the reference pattern 6. Further, the light-receiving unit 8 outputs a detection result to the signal processing unit 3. In this example, a light-receiving element 10 is disposed to detect light that has passed through the light-transmitting part 6A of the reference pattern 6. In this way, the light-receiving unit 8 outputs an electric signal that is obtained by converting the light that has passed through the light-transmitting part 6A of the reference pattern 6 into the electric signal (an optical/electrical conversion) to the signal processing unit 3.

The light-receiving unit 9 is configured so that it can detect light that has passed through the incremental pattern 7. Further, the light-receiving unit 9 outputs a detection result to the signal processing unit 3. For example, the light-receiving unit 9 outputs an electric signal that is obtained by converting the light that has passed through the incremental pattern 7 into the electric signal (an optical/electrical conversion) to the signal processing unit 3. The light-receiving unit 9 is formed as a light-receiving element array in which an even number of light-receiving elements 11 (e.g., photodiodes) are arranged with a pitch suitable for detecting interference fringes formed by light diffracted by the incremental pattern 7.

Alternatively, the light-receiving unit 9 may have a configuration in which a diffraction grating including an even number of light-transmitting parts arranged therein is disposed above a photodiode having a large light-receiving area. In such a case, each of the parts where respective light-receiving elements are disposed substantially functions as the above-described light-receiving element.

Figure 3:
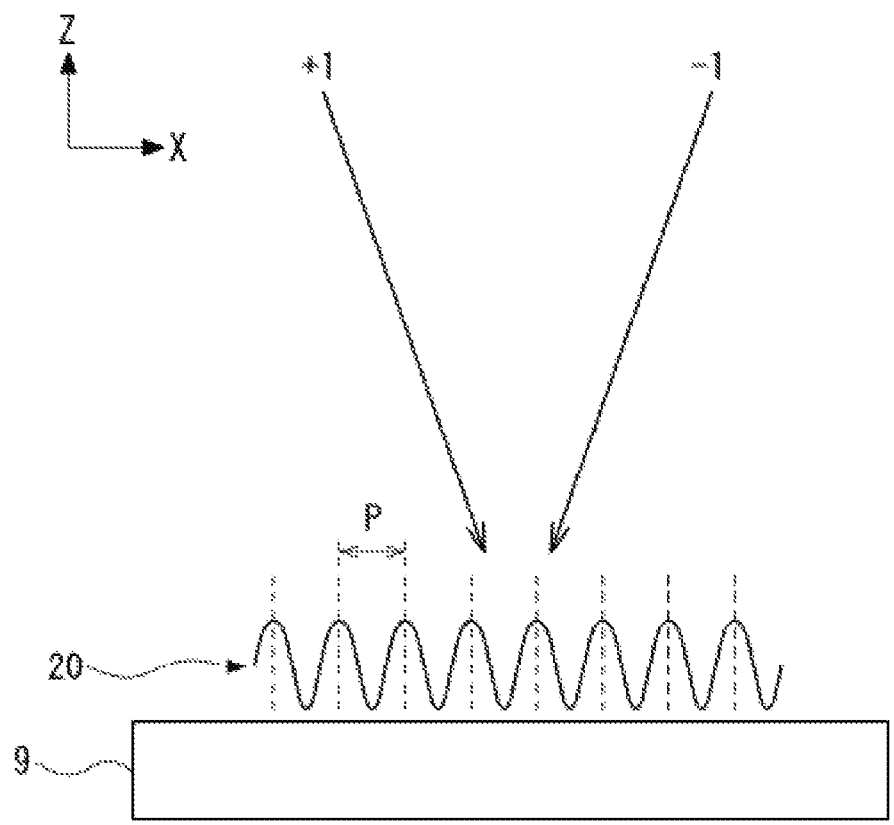
FIG. 3 shows interference fringes formed on a detection unit by +1st order diffracted light and −1st order diffracted light.

Next, interference fringes formed on the light-receiving unit 9 are explained. Light that has passed through the incremental pattern 7 is diffracted therein and the diffracted light forms interference fringes on the light-receiving unit 9. Firstly, interference fringes 20 formed on the light-receiving unit 9 by +1st order diffracted light and −1st order diffracted light are explained hereinafter. FIG. 3 shows the interference fringes 20 formed on the light-receiving unit 9 by the +1st order and −1st order diffracted light. As shown in FIG. 3, the interference fringes 20 having a period P are formed on the light-receiving unit 9 by the +1st order and −1st order diffracted light. Hereinafter, the period of the interference fringes 20 formed on the light-receiving unit 9 by the +1st order and −1st order diffracted light is referred to as a "fundamental period P".

However, other orders of diffracted light, i.e., diffracted light having orders other than the +1st order and −1st order that have passed through the incremental pattern 7 are also incident on the light-receiving unit 9. Among the other orders of diffracted light, 0th order diffracted light has a large optical intensity. Therefore, the interference fringes formed on the light-receiving unit 9 are affected by the 0th order diffracted light.

Figure 4:
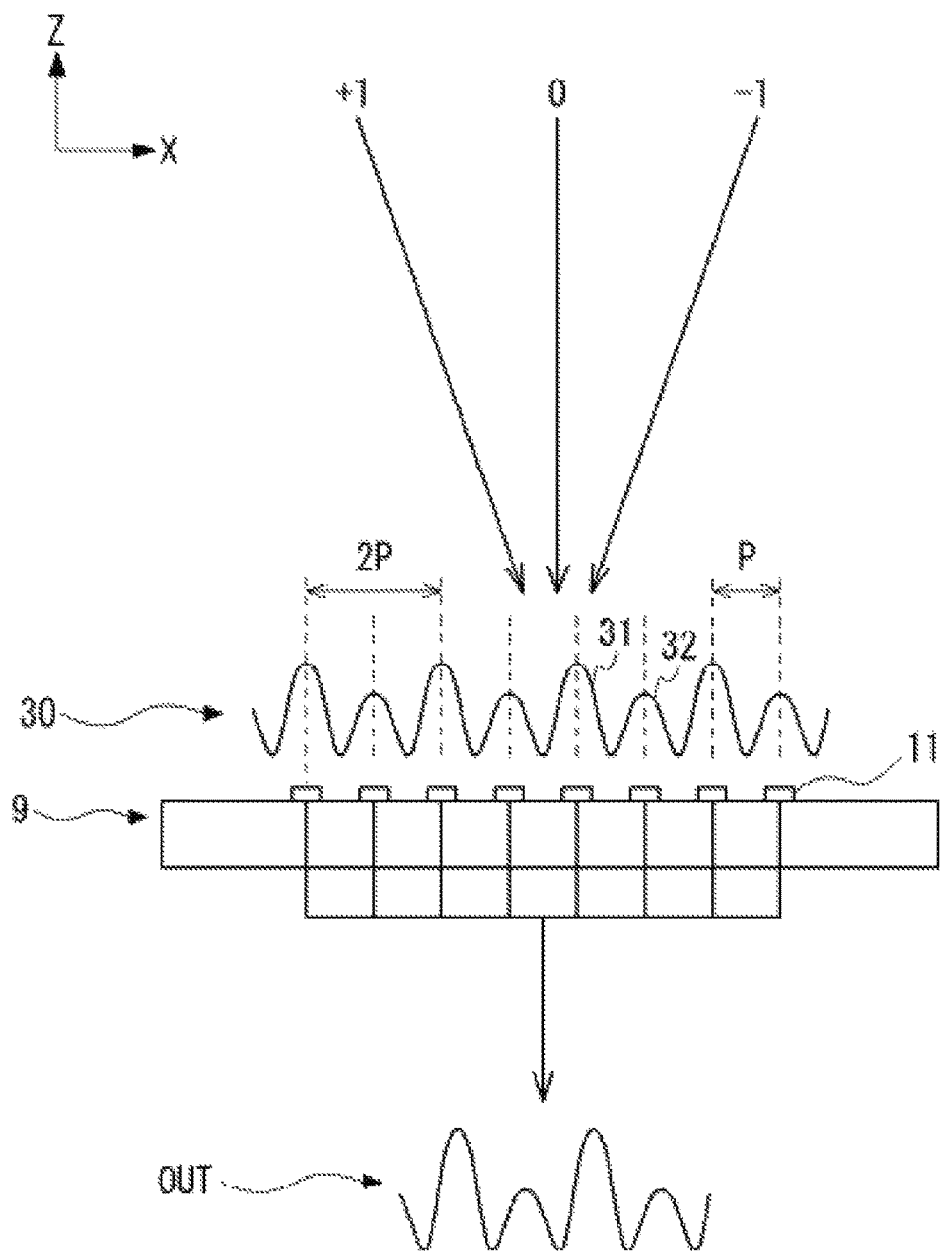
FIG. 4 shows interference fringes formed on a detection unit by +1st order diffracted light, −1st order diffracted light, and 0th order diffracted light.

FIG. 4 shows interference fringes 30 formed on the light-receiving unit 9 by +1st order diffracted light, −1st order diffracted light, and 0th order diffracted light. As shown in FIG. 4, high peaks 31 and low peaks 32 are alternately appearable in the interference fringes 30 formed on the light-receiving unit 9 by the +1st order diffracted light, the −1st order diffracted light, and the 0th order diffracted light. Since the high peaks 31 and the low peaks 32 are apart from each other by a distance equivalent to the fundamental period P, the interference fringes 30 have a waveform in which high peaks 31 and low peaks 32 repeatedly (and alternately) appear with a period 2P, i.e., twice the fundamental period P. Therefore, when the optical intensity of the interference fringes 30 is simply converted into an electric signal (an optical/electrical conversion), an output signal OUT, which indicates the conversion result, also has a waveform in which high peaks and low peaks appear with the period 2P, i.e., twice the fundamental period P.

To cope with this, in the optical displacement encoder 100, the effect of unnecessary interference terms such as the above-described 0th order diffracted light is reduced or prevented by configuring and arranging the light-receiving elements of the light-receiving unit 9 in conformity with the below-shown design conditions. The configuration and arrangement of the light-receiving elements 11 of the light-receiving unit 9 in this exemplary embodiment are explained hereinafter in detail. In the light-receiving unit 9, a plurality of light-receiving elements 11 are arranged in the X-direction so that the following design conditions 1 to 3 are satisfied.

[Design Condition 1]

In this exemplary embodiment, the light-receiving elements 11 of the light-receiving unit 9 are arranged so that the number of light-receiving elements 11 arranged in the X-direction becomes an even number. Hereinafter, this condition is referred to as a "Design Condition 1".

[Design Condition 2]

Further, in this exemplary embodiment, the light-receiving elements 11 of the light-receiving unit 9 are arranged so that a period (or a cycle) with which the light-receiving elements 11 are arranged in the X-direction becomes an odd-number multiple of the fundamental period P of the interference fringes (i.e., a number that is obtained by multiplying the fundamental period P by an odd number). Hereinafter, this condition is referred to as a "Design Condition 2".

[Design Condition 3]

Further, in this exemplary embodiment, the light-receiving elements 11 of the light-receiving unit 9 are formed so that a width W of each of the light-receiving elements 11 in the X-direction is not equal to an integral multiple of the fundamental period P of the interference fringes (i.e., a number that is obtained by multiplying the fundamental period P by an integer). Hereinafter, this condition is referred to as a "Design Condition 3".

By satisfying the above-described design conditions 1 to 3, the light-receiving unit 9 can remove the effect of the periodicity of twice the fundamental period P on the interference fringes 30 caused by the 0th order diffracted light, thus making it possible to obtain an output signal that changes with the fundamental period P. The mechanism for this feature is explained hereinafter by using examples.

EXAMPLE 1

Figure 5:
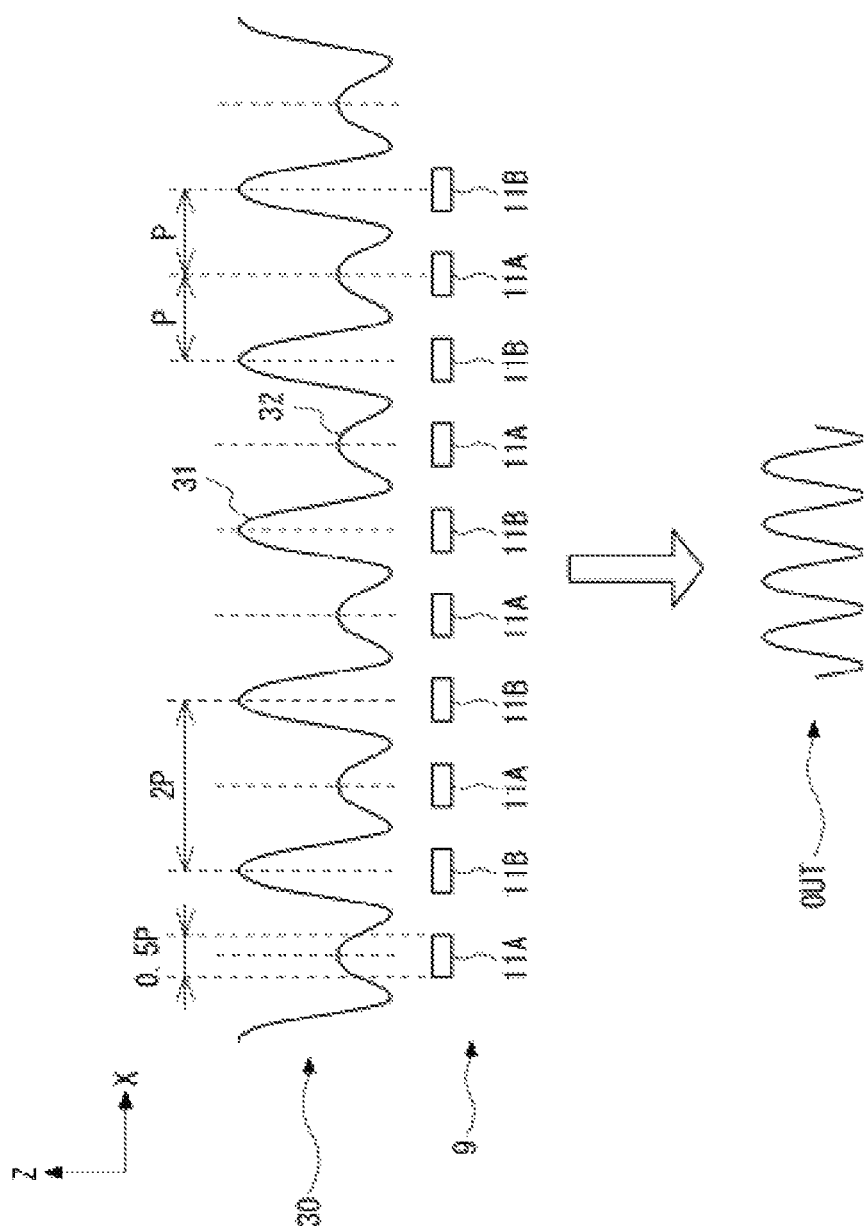
FIG. 5 shows a relation between interference fringes and light-receiving elements according to Example 1.

FIG. 5 shows a relation between interference fringes and light-receiving elements according to Example 1. In Example 1, the number of arranged light-receiving elements is ten and the period (i.e., the cycle) with which the light-receiving elements are arranged (hereinafter referred to as an "arrangement period") is equal to the fundamental period P of the interference fringes. Further, the width W of each of the light-receiving elements is 0.5 times the fundamental period P (i.e., a half of the fundamental period P) of the interference fringes. Note that in this example, light-receiving elements 11A and light-receiving elements 11B are alternately arranged.

As for the light-receiving elements 11A, they are arranged with a period 2P, i.e., twice the fundamental period P as shown in FIG. 5. As for the light-receiving elements 11B, they are also arranged with the period 2P, i.e., twice the fundamental period P. That is, the light-receiving elements 11A detect an optical intensity at a phase θ in the interference fringes, which change with the period 2P, i.e., twice the fundamental period P. Meanwhile, the light-receiving elements 11B detect an optical intensity at a phase (θ+2π) in the interference fringes, which change with the period 2P, i.e., twice the fundamental period P.

Hereinafter, a half of the number of arranged light-receiving elements is represented by n and the intensity of light at the phase θ detected by each of the light-receiving elements 11A and 11B is represented by I(θ). The phase θ is defined for the fundamental period P. Every time the phase θ changes by $2\pi$, the interference fringes move by a distance equivalent to the fundamental period P. Further, since the interference fringes 30 have a period twice the fundamental period P as described above, the optical intensity I(θ) detected at the phase θ by each of the light-receiving elements 11A and 11B has the same value every time the phase θ changes by $4\pi$. That is, relations "I(θ)≠I(θ+2π)" and "I(θ)=I(θ+4π)" hold. These relations also hold in the below-described examples and comparative examples. Here, the below-shown Expression [1] holds under the above-explained conditions.

$$I_{TOTAL} = nI(\theta) + nI(\theta + 2\pi) \qquad [1]$$

where $I_{TOTAL}$ is the intensity of light detected by the light-receiving unit 9.

As shown in the below-shown Expression [2], Expression [1] has the same value every time the phase changes by $2\pi$.

Therefore, in the intensity $I_{TOTAL}$, peaks having the same height appear with a period equal to the fundamental period P.

$$I_{TOTAL} = nI(\theta + 2\pi) + nI(\theta + 2\pi + 2\pi) \quad [2]$$
$$= nI(\theta + 2\pi) + nI(\theta)$$
$$= nI(\theta) + nI(\theta + 2\pi)$$

From the above explanation, it can be understood that an output signal OUT that rises and falls with the fundamental period P can be obtained.

EXAMPLE 2

Figure 6:
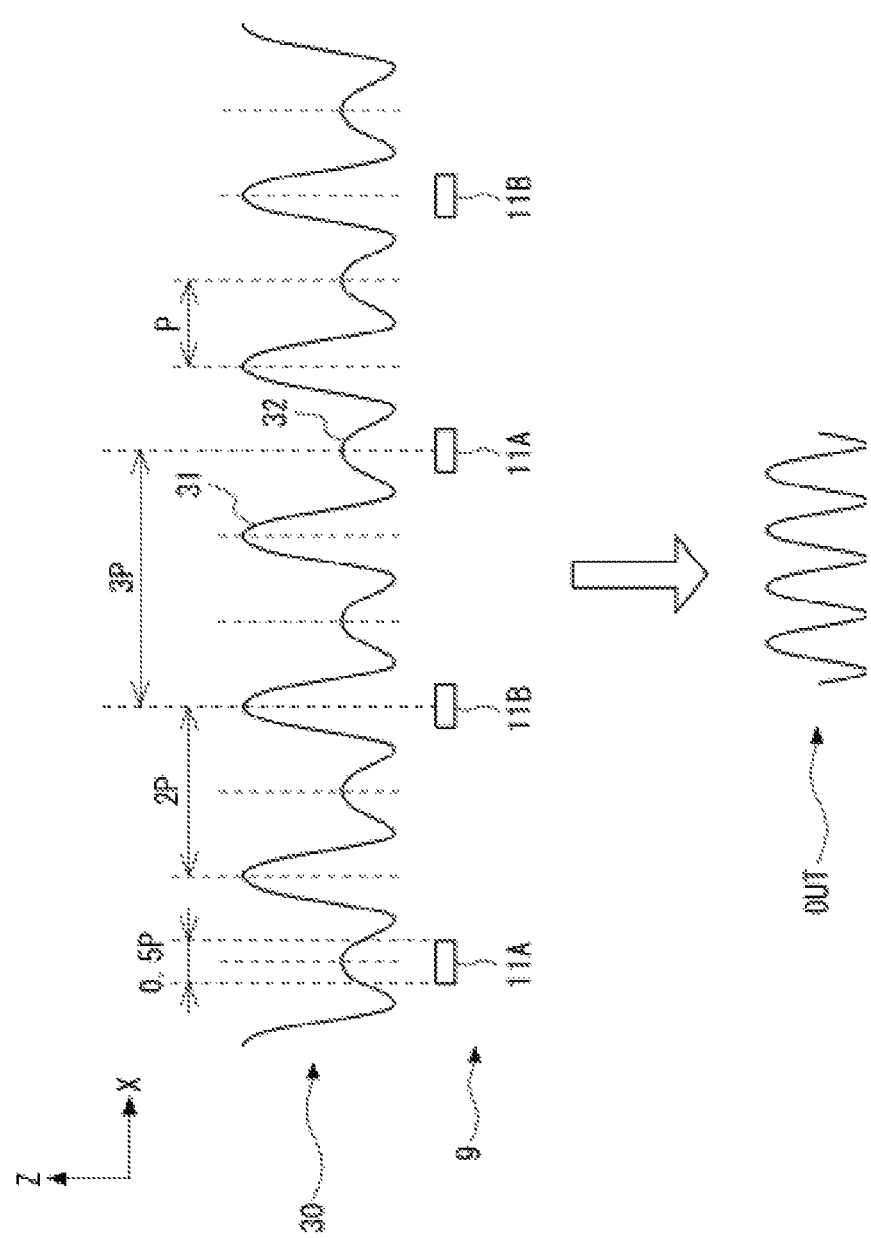
FIG. 6 shows a relation between interference fringes and light-receiving elements according to Example 2.

FIG. 6 shows a relation between interference fringes and light-receiving elements according to Example 2. In Example 2, the number of arranged light-receiving elements is four and the arrangement period of the light-receiving elements is three times the fundamental period P of the interference fringes. Further, the width W of each of the light-receiving elements is 0.5 times the fundamental period P of the interference fringes. In this example, light-receiving elements 11A and light-receiving elements 11B are alternately arranged.

As for the light-receiving elements 11A, they are arranged with a period 6P, i.e., six times the fundamental period P as shown in FIG. 6. As for the light-receiving elements 11B, they are also arranged with a period 6P, i.e., six times the fundamental period P. That is, the light-receiving elements 11A detect an optical intensity at a phase θ in the interference fringes, which change with the period 2P, i.e., twice the fundamental period P. Meanwhile, the light-receiving elements 11B detect an optical intensity at a phase (θ+6π) in the interference fringes, which change with the period 2P, i.e., twice the fundamental period P.

The below-shown Expression [3] holds.

$$I_{TOTAL} = nI(\theta) + nI(\theta + 6\pi) \quad [3]$$
$$= nI(\theta) + nI(\theta + 2\pi + 4\pi)$$
$$= nI(\theta) + nI(\theta + 2\pi)$$

where: n is a half of the number of arranged light-receiving elements; I(θ) is the intensity of light at the phase θ detected by each of the light-receiving elements 11A and 11B; and $I_{TOTAL}$ is the intensity of light detected by the light-receiving unit 9.

That is, Expression [3] is the same as Expression [1] of Example 1. Therefore, similarly to Example 1, in the intensity $I_{TOTAL}$, peaks having the same height appear with a period equal to the fundamental period P. From the above explanation, it can be understood that an output signal OUT that rises and falls with the fundamental period P can be obtained.

EXAMPLE 3

Figure 7:
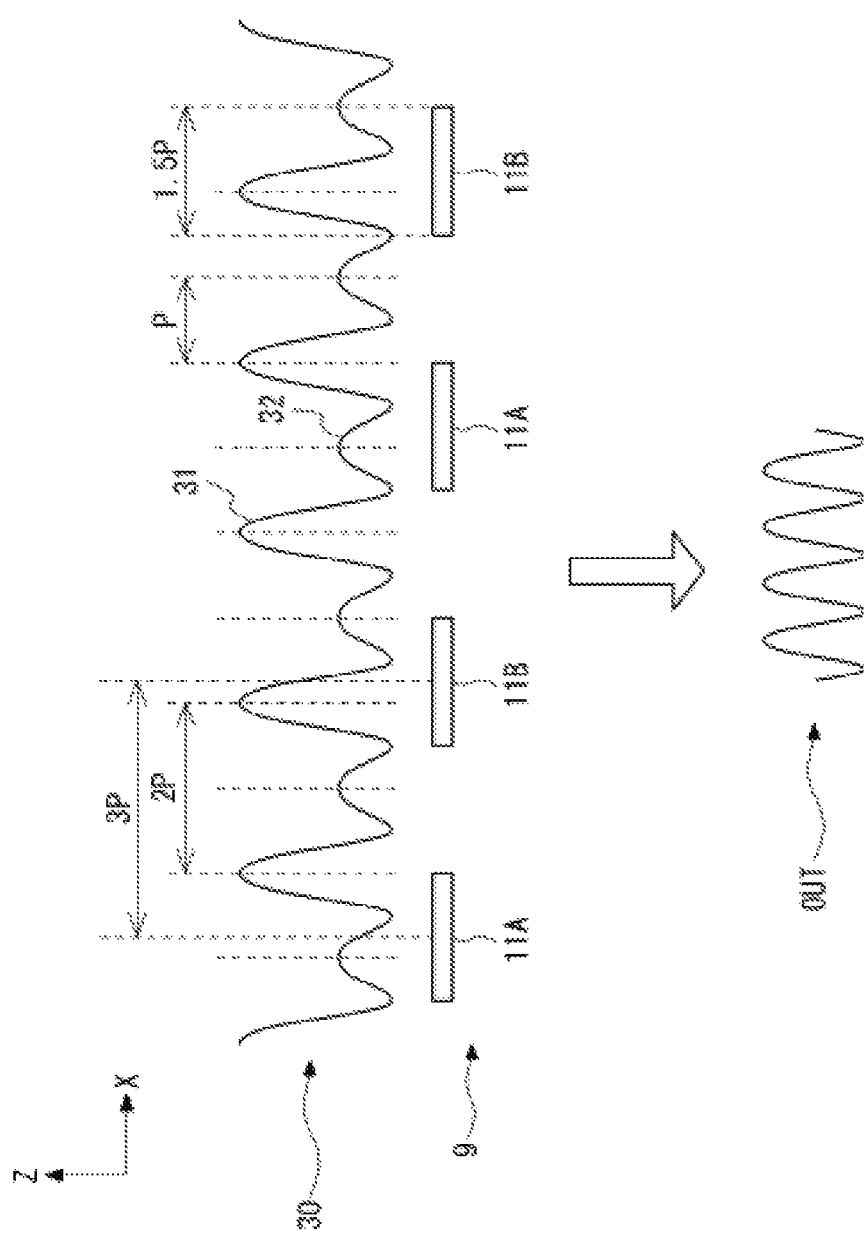
FIG. 7 shows a relation between interference fringes and light-receiving elements according to Example 3.

FIG. 7 shows a relation between interference fringes and light-receiving elements according to Example 3. In Example 3, the number of arranged light-receiving elements is four and the arrangement period of the light-receiving elements is three times the fundamental period P of the interference fringes. Further, the width W of each of the light-receiving elements is 1.5 times the fundamental period P of the interference fringes. In this example, light-receiving elements 11A and light-receiving elements 11B are alternately arranged.

In this configuration, although the width of each of the light-receiving elements differs from that in Examples 1 and 2, the light-receiving elements 11A detect the same waveform as that in Examples 1 and 2 and the light-receiving elements 11B also detect the same waveform as that in Examples 1 and 2. Further, the number of light-receiving elements 11A is equal to the number of light-receiving elements 11B. Therefore, Expressions [1] and [2] hold as in the case of Example 1. As a result, similarly to Example 2, an output signal OUT that rises and falls with the fundamental period P can be obtained.

EXAMPLE 4

Figure 8:
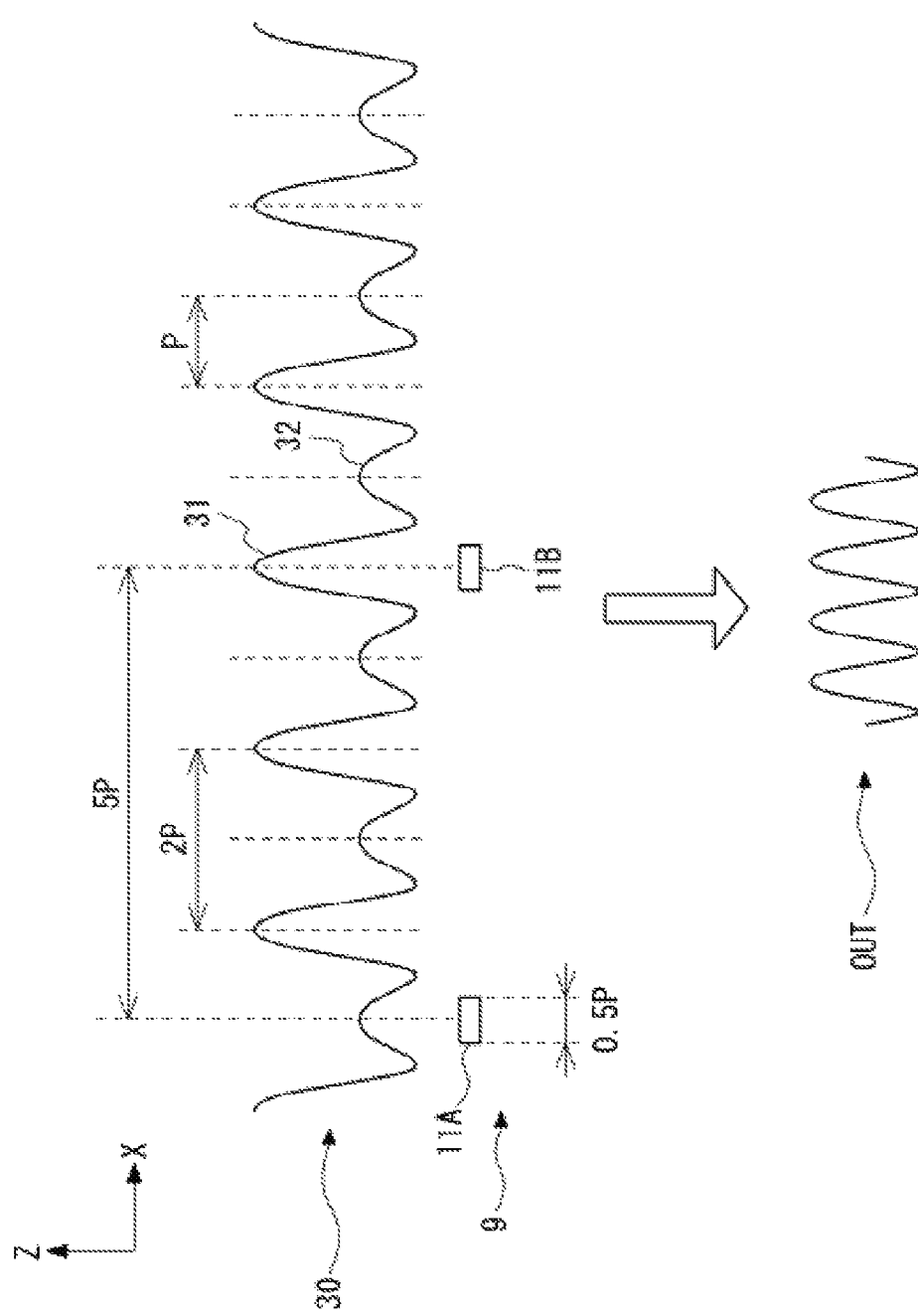
FIG. 8 shows a relation between interference fringes and light-receiving elements according to Example 4.

FIG. 8 shows a relation between interference fringes and light-receiving elements according to Example 4. In Example 4, the number of arranged light-receiving elements is two and the arrangement period of the light-receiving elements is five times the fundamental period P of the interference fringes. Further, the width W of each of the light-receiving elements is 1.5 times the fundamental period P of the interference fringes. In this example, light-receiving elements 11A and light-receiving elements 11B are alternately arranged.

In this configuration, although the number of light-receiving elements and the width of each light-receiving element differ from those in Example 3, the light-receiving element 11A is apart from the light-receiving element 11B by a distance that is five times the fundamental period P. Consequently, the above-shown Expressions [1] and [2] hold. As a result, similarly to Example 3, an output signal OUT that rises and falls with the fundamental period P can be obtained.

EXAMPLE 5

Figure 9:
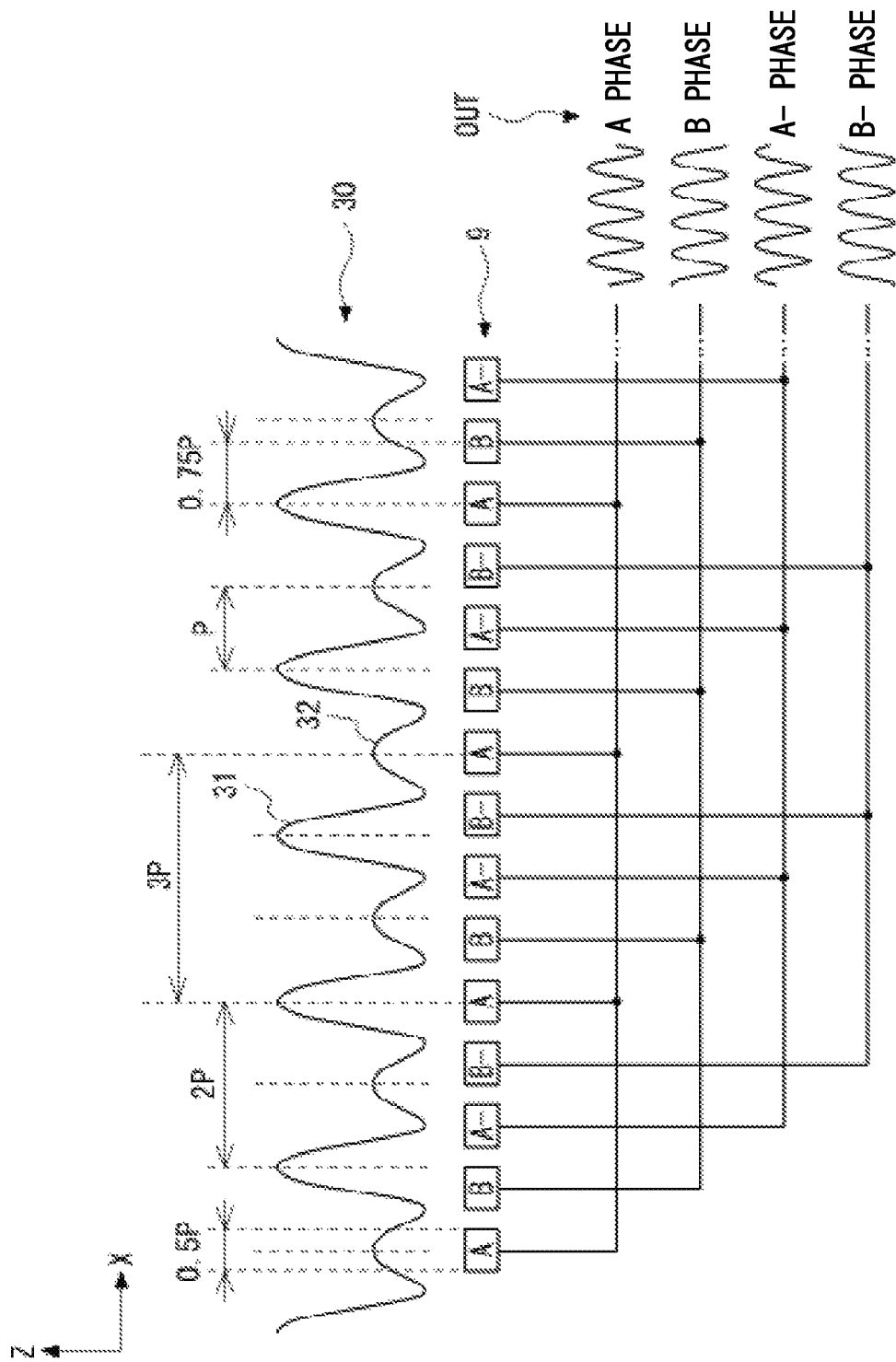
FIG. 9 shows a relation between interference fringes and light-receiving elements according to Example 5.

An Example 5 is a modified example of Example 2 and is an example in which four-phase signals are obtained. FIG. 9 shows a relation between interference fringes and light-receiving elements according to Example 5. In Example 5, the number of arranged light-receiving elements for each phase is an even number and the arrangement period of the light-receiving elements for each phase is three times the fundamental period P of the interference fringes.

Further, the width W of each of the light-receiving elements for each phase is 0.5 times the fundamental period P of the interference fringes. Further, in this example, light-receiving elements for an A phase, a B phase, an A– phase, and a B– phase are indicated by using symbols A, B, A– and B–, respectively.

As shown in FIG. 9, each of light-receiving elements 12 to 15 for the A, B, A– and B– phases, respectively, are arranged in a manner similar to that for the light-receiving elements 11 (light-receiving elements 11A and 11B) according to Example 2. In other words, although the arrangement period of light-receiving elements adjacent to each other is 0.75 times the fundamental period P, because of the fact that Example 5 is configured so that four-phase signals are obtained, when attention is given to the light-receiving elements for each phase, the arrangement of the light-receiving elements for each phase is similar to that in Example 2. That is, according to Example 5, an output signal OUT that rises and falls with the fundamental period P can be obtained without being affected by unnecessary interference light as in the case of Example 2.

Further, for comparisons with the above-described examples, comparative examples in which at least one of the above-described design conditions 1 to 3 is not satisfied are examined.

COMPARATIVE EXAMPLE 1

Figure 10:
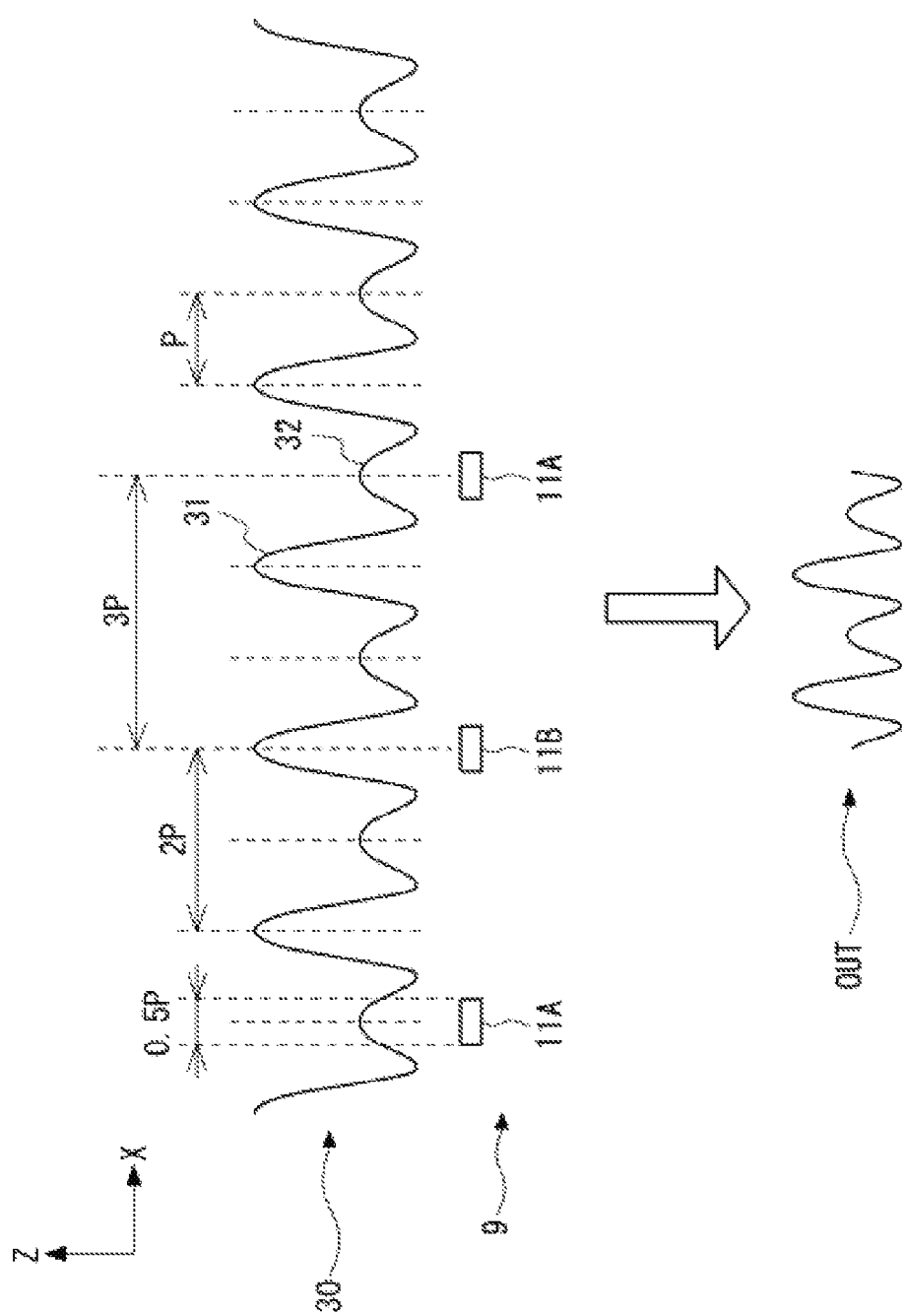
FIG. 10 shows a relation between interference fringes and light-receiving elements according to a Comparative Example 1.

FIG. 10 shows a relation between interference fringes and light-receiving elements according to Comparative Example 1. In Comparative Example 1, the number of arranged light-receiving elements is three and the arrangement period of the light-receiving elements is three times the fundamental period P of the interference fringes. Further, the width W of each of the light-receiving elements is 0.5 times the fundamental period P of the interference fringes. In this example, light-receiving elements 11A and light-receiving elements 11B are alternately arranged. That is, Comparative Example 1 does not satisfy the above-described Design Condition 1.

The below-shown Expression [4] holds.

$$I_{TOTAL} = (m+1)I(\theta) + mI(\theta + 2\pi) \quad [4]$$

where: m is a value obtained by dividing the number of arranged light-receiving elements by two; $I(\theta)$ is the intensity of light at the phase $\theta$ detected by each of the light-receiving elements 11A and 11B; and $I_{TOTAL}$ is the intensity of light detected by the light-receiving unit 9.

In Expression [4], when the phase changes by $2\pi$, i.e., by the fundamental period P, the below-shown Expression [5] is obtained.

$$I_{TOTAL} = (m+1)I(\theta + 2\pi) + mI(\theta + 2\pi + 2\pi) \quad [5]$$
$$= (m+1)I(\theta + 2\pi) + mI(\theta)$$

Since the interference fringes change with the period 2P, i.e., twice the fundamental period P as described above, the optical intensities of the interference fringes at places that are apart from each other by the fundamental period P are not equal to each other. Therefore, the value of the intensity $I_{TOTAL}$ in Expression [3] differs from that in Expression [4].

In Expression [4], when the phase changes by $4\pi$, i.e., twice the fundamental period P, the below-shown Expression [6] is obtained.

$$I_{TOTAL} = (m+1)I(\theta + 4\pi) + mI(\theta + 2\pi + 4\pi) \quad [6]$$
$$= (m+1)I(\theta) + mI(\theta + 2\pi)$$

Therefore, Expression [5] becomes identical to Expression [3]. That is, in the intensity $I_{TOTAL}$, peaks having the same height appear with a period equal to twice the fundamental period P. As a result, the output signal OUT becomes a signal that changes with the period equal to twice the fundamental period P as in the case of the interference fringes 30 and has a waveform in which peaks having different heights are present in a mixed manner. Consequently, the accuracy of position detection deteriorates.

COMPARATIVE EXAMPLE 2

Figure 11:
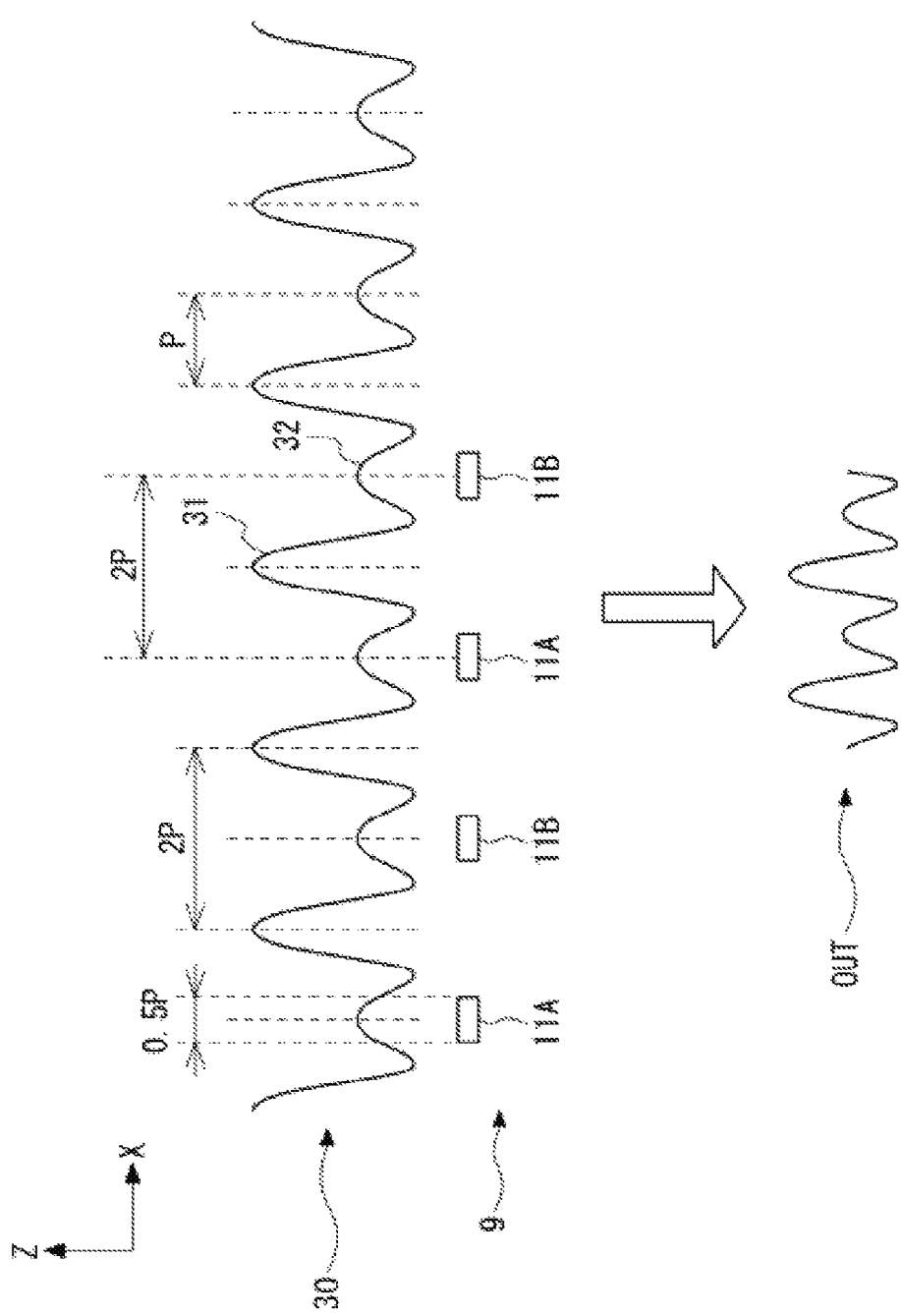
FIG. 11 shows a relation between interference fringes and light-receiving elements according to a Comparative Example 2.

FIG. 11 shows a relation between interference fringes and light-receiving elements according to Comparative Example 2. In Comparative Example 2, the number of arranged light-receiving elements is four and the arrangement period of the light-receiving elements is twice the fundamental period P of the interference fringes. Further, the width W of each of the light-receiving elements is 0.5 times the fundamental period P of the interference fringes. In this example, light-receiving elements 11A and light-receiving elements 11B are alternately arranged. That is, Comparative Example 2 does not satisfy the above-described Design Condition 2.

As for the light-receiving elements 11A, they are arranged with a period 4P, i.e., four times the fundamental period P as shown in FIG. 11. As for the light-receiving elements 11B, they are also arranged with the period 4P, i.e., four times the fundamental period P.

The below-shown Expression [7] holds.

$$I_{TOTAL} = nI(\theta) + nI(\theta + 4\pi) \quad [7]$$
$$= 2nI(\theta)$$

where: n is a half of the number of arranged light-receiving elements; $I(\theta)$ is the intensity of light at the phase $\theta$ detected by each of the light-receiving elements 11A and 11B; and $I_{TOTAL}$ is the intensity of light detected by the light-receiving unit 9.

That is, since the intensity $I_{TOTAL}$ directly reflects the optical intensity of the interference fringes at the phase $\theta$ as shown in Expression [6], it changes with the period 2P i.e., twice the fundamental period P as in the case of the interference fringes. As a result, the output signal OUT becomes a signal that changes with a period equal to twice the fundamental period P as in the case of the interference fringes 30 and has a waveform in which peaks having different heights are present in a mixed manner. Consequently, the accuracy for position detection deteriorates.

COMPARATIVE EXAMPLE 3

Figure 12:
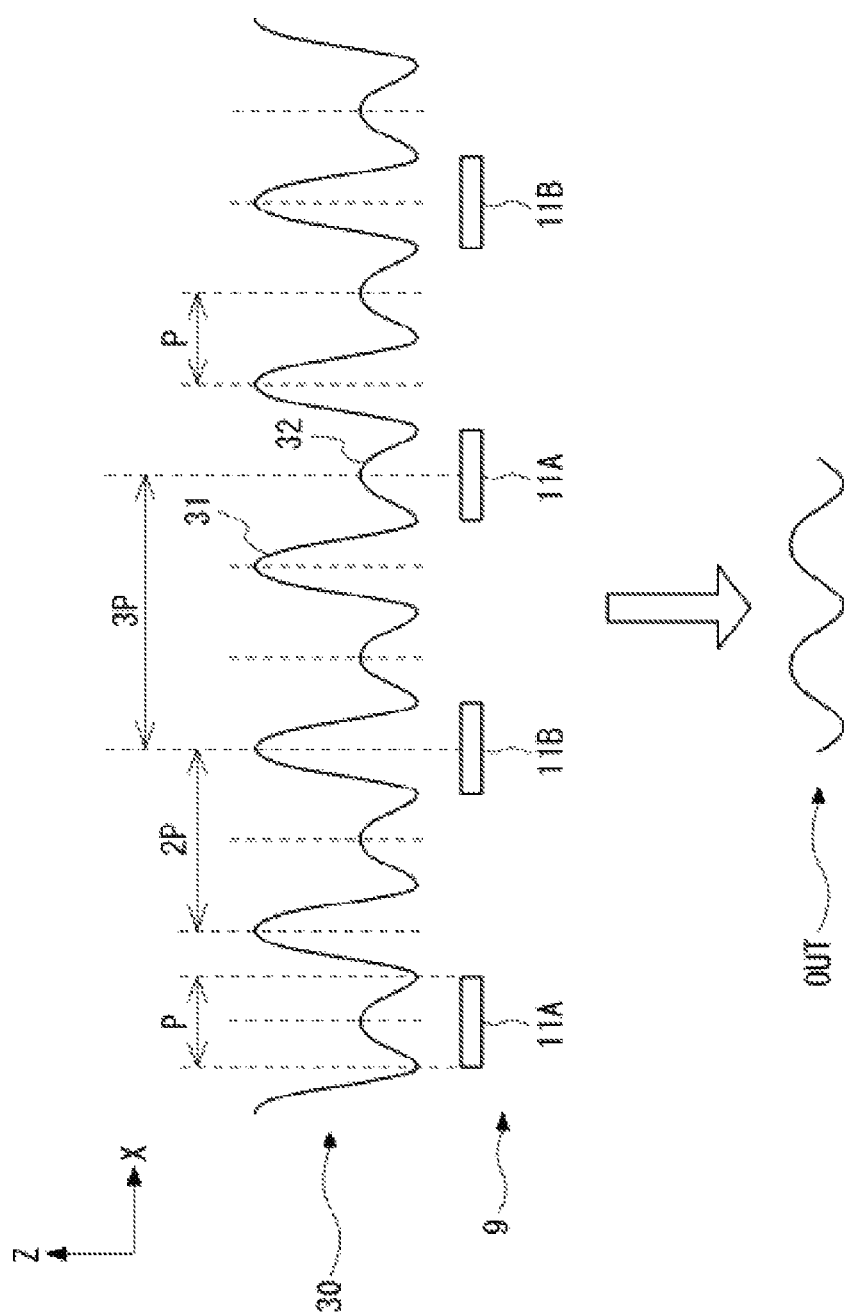
FIG. 12 shows a relation between interference fringes and light-receiving elements according to a Comparative Example 3.

FIG. 12 shows a relation between interference fringes and light-receiving elements according to Comparative Example 3. In Comparative Example 3, the number of arranged light-receiving elements is four and the arrangement period of the light-receiving elements is three times the fundamental period P of the interference fringes. Further, the width W of each of the light-receiving elements is equal to the fundamental period P of the interference fringes. In this example, light-receiving elements 11A and light-receiving elements 11B are alternately arranged. That is, Comparative Example 3 does not satisfy the above-described Design Condition 3.

In this example, the waveform of the interference fringes detected by the light-receiving elements 11A is the same as the waveform of the interference fringes in Example 2. Further, the waveform of the interference fringes detected by the light-receiving elements 11B is also the same as the waveform of the interference fringes in Example 2. However, since the width W of each of the light-receiving elements is equal to the fundamental period P, the output signal OUT from the 9 is smoothed. As a result, the period of the output signal OUT is twice the fundamental period P. That is, since the period of the output signal OUT becomes longer than the fundamental period P, the accuracy for position detection deteriorates accordingly.

In this example, the case where the width W of each of the light-receiving elements is equal to the fundamental period P is explained. However, the above-described matter also holds true when the width W of each of the light-receiving elements is an odd-number multiple of the fundamental period P.

COMPARATIVE EXAMPLE 4

Figure 13:
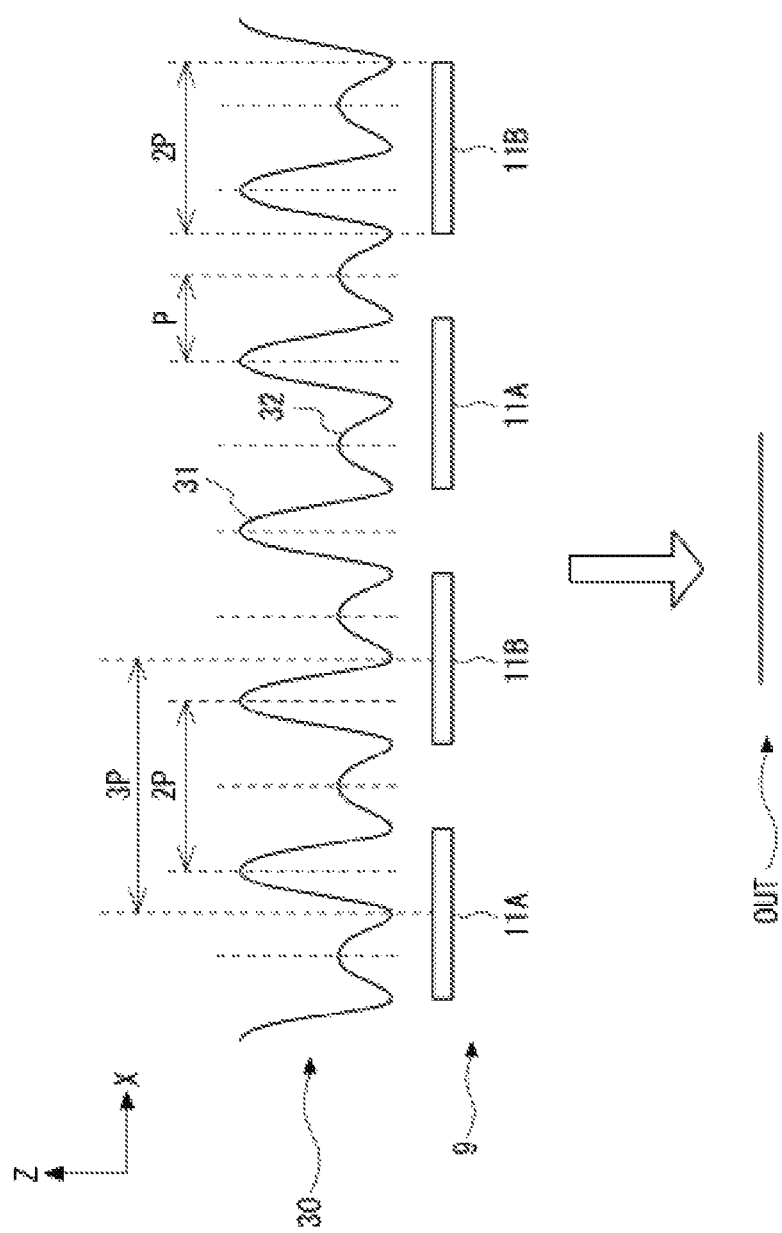
FIG. 13 shows a relation between interference fringes and light-receiving elements according to a Comparative Example 4.

FIG. 13 shows a relation between interference fringes and light-receiving elements according to Comparative Example 4. In Comparative Example 4, the number of arranged light-receiving elements is four and the arrangement period of the light-receiving elements is three times the fundamental period P. Further, the width W of each of the light-receiving elements is twice the fundamental period P of the interference fringes. That is, Comparative Example 4 does not satisfy the above-described Design Condition 3.

In this example, the waveform of the interference fringes detected by the light-receiving elements 11A is the same as the waveform of the interference fringes in Example 2. Further, the waveform of the interference fringes detected by the light-receiving elements 11B is also the same as the waveform of the interference fringes in Example 2. However, since the width W of each of the light-receiving elements is twice the fundamental period P and equal to the period of the interference fringes 30, the intensity of the light detected by the light-receiving unit 9 becomes constant. As a result, the output signal OUT becomes a signal having no periodicity, thus making it impossible to carry out the position detection.

In this example, the case where the width W of each of the light-receiving elements is twice the fundamental period P is explained. However, the above-described matter also holds true when the width W of each of the light-receiving elements is an even-number multiple of the fundamental period P.

In the above explanation, attention is given to the 0th order diffracted light, which has the largest effect among the unnecessary diffracted light. However, the configuration according to this exemplary embodiment can also reduce the effect caused by unnecessary diffracted light having other orders. The mechanism for this feature is explained hereinafter by using an example in which the effect caused by +2nd order diffracted light and −2nd order diffracted light is reduced or prevented.

When complex amplitudes of +2nd order diffracted light, +1st order diffracted light, 0th order diffracted light, −1st order diffracted light, and −2nd order diffracted light are represented by $u_{+2}$, $u_{+1}$, $u_0$, $u_{-1}$ and $u_{-2}$, respectively, interference fringes formed on the light-receiving unit 9 can be expressed as a sum total I of products of these five complex amplitudes and their conjugate five complex amplitudes. Note that the conjugate of the complex amplitude of diffracted light having a given order is indicated by a bar added above its symbol.

$$I = (u_{-2} + u_{-1} + u_0 + u_{+1} + u_{+2}) \cdot (\overline{u_{-2}} + \overline{u_{-1}} + \overline{u_0} + \overline{u_{+1}} + \overline{u_{+2}}) =$$

$$u_{-2} \cdot \overline{u_{-2}} + u_{-2} \cdot \overline{u_{-1}} + u_{-2} \cdot \overline{u_0} + u_{-2} \cdot \overline{u_{+1}} + u_{-2} \cdot \overline{u_{+2}} + u_{-1} \cdot \overline{u_{-2}} +$$

$$u_{-1} \cdot \overline{u_{-1}} + u_{-1} \cdot \overline{u_0} + u_{-1} \cdot \overline{u_{+1}} + u_{-1} \cdot \overline{u_{+2}} + u_0 \cdot \overline{u_{-2}} + u_0 \cdot \overline{u_{-1}} + u_0 \cdot \overline{u_0} +$$

$$u_0 \cdot \overline{u_{+1}} + u_0 \cdot \overline{u_{+2}} + u_{+1} \cdot \overline{u_{-2}} + u_{+1} \cdot \overline{u_{-1}} + u_{+1} \cdot \overline{u_0} + u_{+1} \cdot \overline{u_{+1}} +$$

$$u_{+1} \cdot \overline{u_{+2}} + u_{+2} \cdot \overline{u_{-2}} + u_{+2} \cdot \overline{u_{-1}} + u_{+2} \cdot \overline{u_0} + u_{+2} \cdot \overline{u_{+1}} + u_{+2} \cdot \overline{u_{+2}}$$

The period of interference fringes indicated by each term of the above-shown expression can be calculated from the traveling directions of two diffracted light. Since the period of interference fringes formed by the +1st order and −1st order diffracted light is the fundamental period P, the period of interference fringes of each term is as indicated in the below-shown table.

| Terms | Period of interference fringes | Characteristic of interference fringes |
|---|---|---|
| $u_{-1} \cdot \overline{u_{+1}}$, $u_{+1} \cdot \overline{u_{-1}}$ | Fundamental period | Signal component |
| $u_{-2} \cdot \overline{u_{-2}}$, $u_{-1} \cdot \overline{u_{-1}}$, $u_0 \cdot \overline{u_0}$, $u_{+1} \cdot \overline{u_{+1}}$, $u_{+2} \cdot \overline{u_{+2}}$ | Not modulated (DC component) | Unnecessary interference fringes |
| $u_0 \cdot \overline{u_{+1}}$, $u_{+1} \cdot \overline{u_0}$, $u_0 \cdot \overline{u_{-1}}$, $u_{-1} \cdot \overline{u_0}$ | Twice of fundamental period | |
| $u_{+1} \cdot \overline{u_{+2}}$, $u_{+2} \cdot \overline{u_{+1}}$, $u_{-1} \cdot \overline{u_{-2}}$, $u_{-2} \cdot \overline{u_{-1}}$ | Twice of fundamental period | |
| $u_{-1} \cdot \overline{u_{+2}}$, $u_{+2} \cdot \overline{u_{-1}}$, $u_{-1} \cdot \overline{u_{+2}}$, $u_{+2} \cdot \overline{u_{-1}}$ | ⅔ times of fundamental period | |
| $u_0 \cdot \overline{u_{+2}}$, $u_{+2} \cdot \overline{u_0}$, $u_0 \cdot \overline{u_{-2}}$, $u_{-2} \cdot \overline{u_0}$ | Fundamental period | |
| $u_{-2} \cdot \overline{u_{+2}}$, $u_{+2} \cdot \overline{u_{+2}}$ | Half of fundamental period | |

As explained above, the period of interference fringes formed by the 0th order diffracted light and the +1st order diffracted light and the period of interference fringes formed by the 0th order diffracted light and the −1st order diffracted light are twice the fundamental period P. Therefore, their effects can be removed by the above-described configuration.

The period of interference fringes formed by the +1st order diffracted light and the +2nd order diffracted light and the period of interference fringes formed by the −1st order diffracted light and the −2nd order diffracted light are twice the fundamental period P. Therefore, their effects can be removed by the above-described configuration.

The period of interference fringes formed by the −1st order diffracted light and the +2nd order diffracted light and the period of interference fringes formed by the +1st order diffracted light and the −2nd order diffracted light are two thirds of the fundamental period P. In this case, the effect of the unnecessary interference light is eventually removed by the arrangement of the light-receiving elements 11A and 11B.

Therefore, according to this configuration, it is possible to remove a part of the effect of the interference fringes formed by the +2nd order and −2nd order diffracted light, i.e., the effect of the interference fringes that have a period twice the fundamental period P and a period that is two thirds of the fundamental period P.

Meanwhile, the interference fringes formed by the −2nd order and +2nd order diffracted light have a period that is a half of the fundamental period P and the effect of the interference fringes remain without being removed. However, since the optical intensities of the −2nd order and +2nd order diffracted light is significantly smaller than that of the 0th order diffracted light, the −1st order diffracted light, and the +1st order diffracted light, their effects are relatively small (or negligible). Therefore, as described above, it is possible to sufficiently improve position detection accuracy, without removing the effect of the interference fringes formed by the +2nd order and −2nd order diffracted light, by removing the effect caused by the unnecessary diffracted light having the other orders.

Further, it has been explained that interference components having a period that is two thirds of the fundamental period and a period twice the fundamental period can be removed in the above descriptions. However, by giving consideration to cases where diffracted light having the 3rd order and higher are mixed, it is possible to generalize such that interference components having periods that are $2/(2\times n+1)$ times the fundamental period P among all the formed interference fringes can be removed, where n is an integer no less than zero. That is, according to this configuration, it can be understood that an interference component having a specific period among unnecessary interference components caused by mixed diffracted light having high orders higher than the 1st order can be removed.

As described above, according to this configuration, it is possible to reduce or prevent the effect of unnecessary diffracted light without adding an optical element or the like for removing the unnecessary diffracted light. Therefore, since the physical size of the displacement encoder is not increased, it is advantageous for a reduction in the size of the displacement encoder.

Second Exemplary Embodiment

Figure 14:
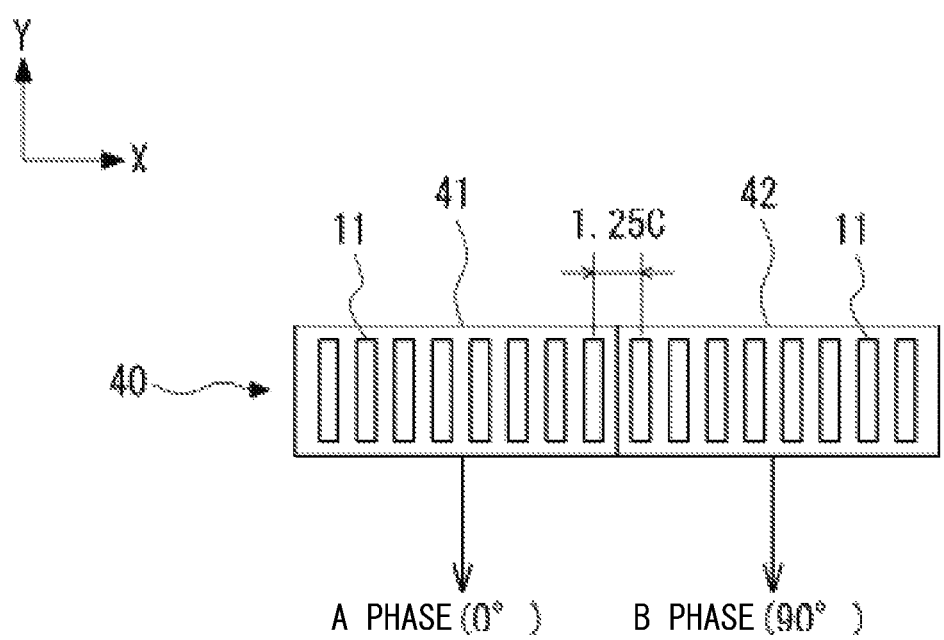
FIG. 14 schematically shows a configuration of a light-receiving unit according to a second exemplary embodiment.

An optical displacement encoder according to a second exemplary embodiment of the present invention is explained. In this exemplary embodiment, a modified example of the light-receiving unit 9 is explained. FIG. 14 schematically shows a configuration of a light-receiving unit according to the second exemplary embodiment. In the light-receiving unit 40, two detection areas 41 and 42 are arranged in the X-direction. Note that the detection areas 41 and 42 are also referred to as first and second light-receiving units, respectively.

Each of the detection areas 41 and 42 has a configuration similar to that of the light-receiving unit 9 according to the first exemplary embodiment. However, the light-receiving elements of the detection area 42 are shifted from those of the detection area 41 in the X-direction by a distance equivalent of a quarter of the fundamental period P. That is, the detection areas 41 and 42 are shifted from each other in the X-direction by a distance equivalent of a quarter of the fundamental period P so as to be apart from each other in the X-direction. In this case, the distance between the nearest light-receiving elements in the connection part between the detection areas 41 and 42 is 1.25C.

According to this configuration, the detection area 41 can output an A phase signal (0°) and the detection area 42 can output a B phase signal (90°). By generating a phase difference signal as described above, it is possible to achieve more accurate position detection.

Figure 15:
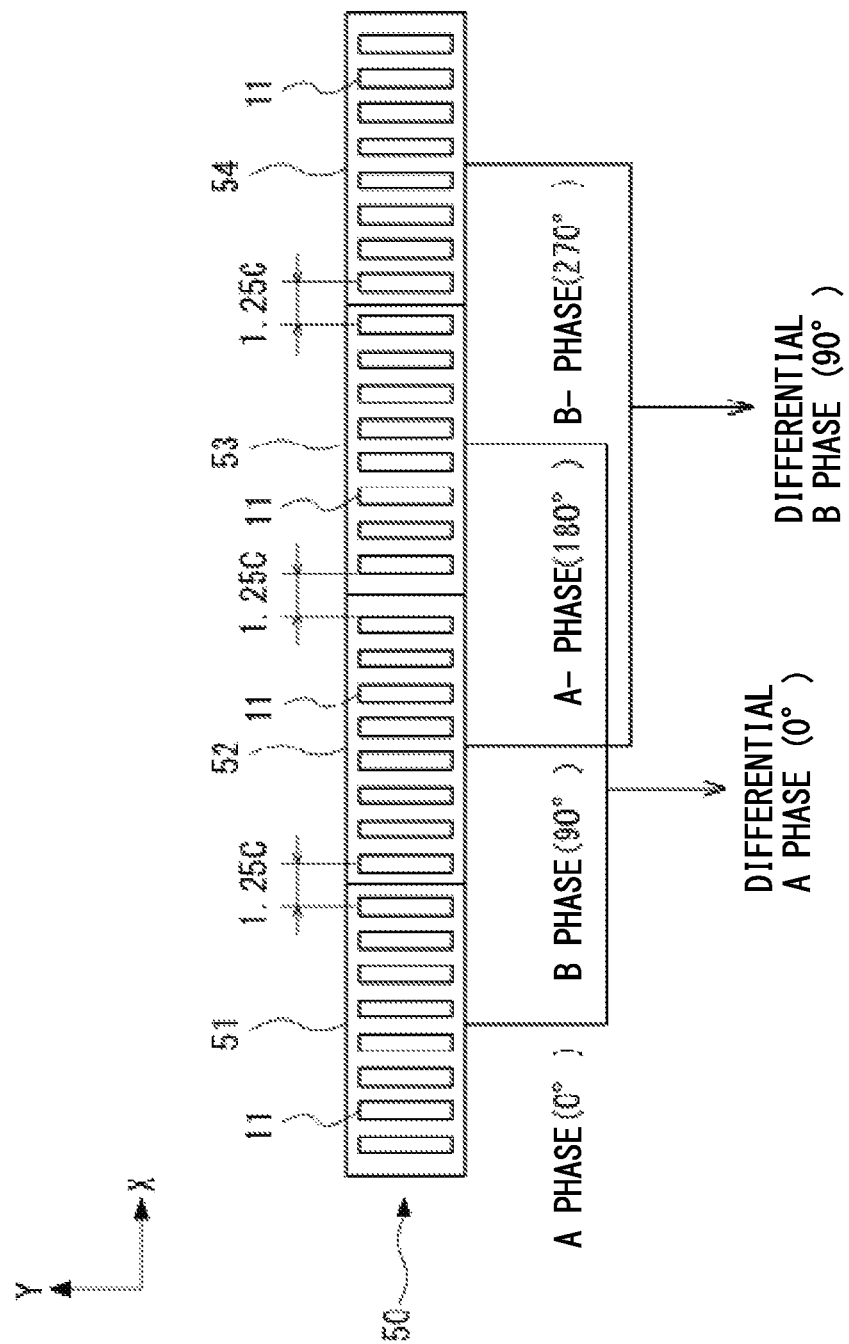
FIG. 15 schematically shows another configuration of a light-receiving unit according to the second exemplary embodiment.

Further, another example of the configuration of the light-receiving unit is explained. FIG. 15 schematically shows another configuration of the light-receiving unit according to the second exemplary embodiment. In the light-receiving unit 50, four detection areas 51 to 54 are arranged in this order in the X-direction. Each of the detection areas 51 to 54 has a configuration similar to that of the light-receiving unit 9 according to the first exemplary embodiment. Note that the detection areas 51 to 54 are also referred to as first to fourth light-receiving units, respectively.

The light-receiving elements of the detection area 52 are shifted from those of the detection area 51 in the X-direction by a distance equivalent of a quarter of the fundamental period P. The light-receiving elements of the detection area 53 are shifted from those of the detection area 52 in the X-direction by a distance equivalent of a quarter of the fundamental period P. The light-receiving elements of the detection area 54 are shifted from those of the detection area 53 in the X-direction by a distance equivalent of a quarter of the fundamental period P. That is, the detection areas 51 to 54 are arranged so that two neighboring light-receiving units are shifted from each other in the X-direction by a distance equivalent of a quarter of the fundamental period P so as to be apart from each other in the X-direction. In this case, the distance between the nearest light-receiving elements in the connection part between two neighboring light-receiving units is 1.25C.

According to this configuration, the detection areas 51, 52, 53 and 54 can output an A phase signal (0°), a B phase signal (90°), an A− phase signal (180°), and a B− phase signal (270°), respectively. In this way, it is possible to generate a differential A phase signal from the A phase signal (0°) and the A− phase signal (180°), and generate a differential B phase signal from the B phase signal (90°) and the B-phase signal (270°). By generating a phase difference signal as described above, it is possible to achieve more accurate position detection.

Figure 16:
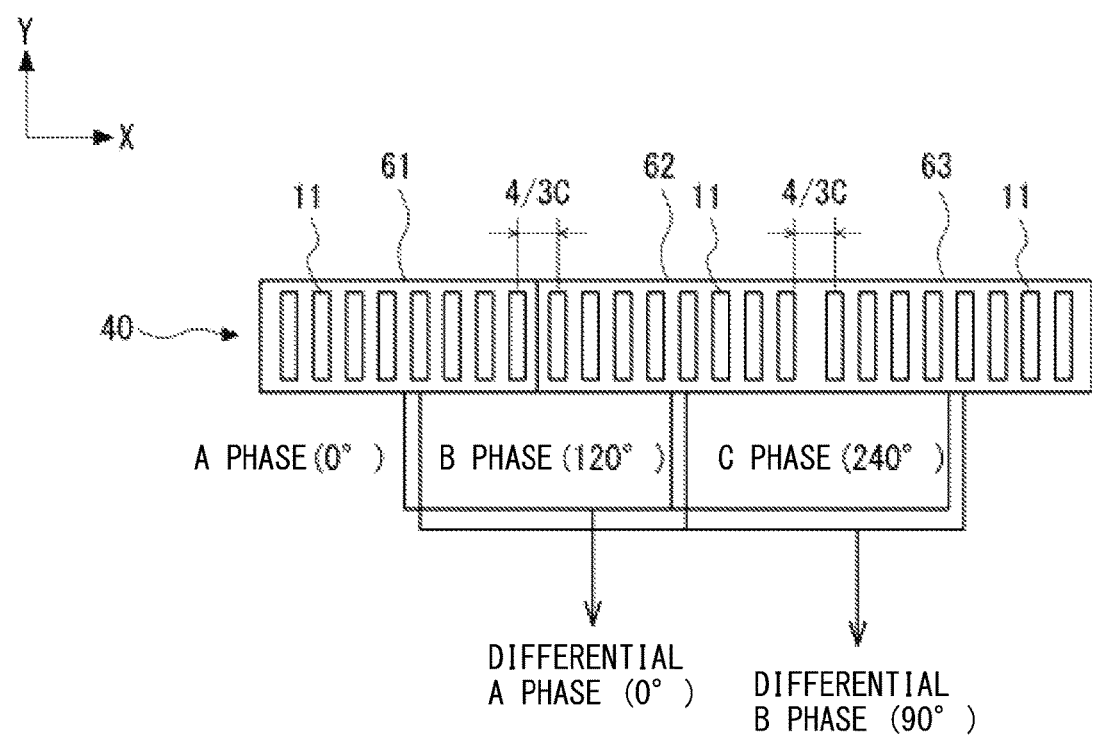
FIG. 16 schematically shows another configuration of a light-receiving unit according to the second exemplary embodiment.

Further, another example of the configuration of the light-receiving unit is explained. FIG. 16 schematically shows another configuration of the light-receiving unit according to the second exemplary embodiment. In the light-receiving unit 60, three detection areas 61 to 63 are arranged in this order in the X-direction. Each of the detection areas 61 to 63 has a configuration similar to that of the light-receiving unit 9 according to the first exemplary embodiment. Note that the detection areas 61 to 63 are also referred to as first to third light-receiving units, respectively.

The light-receiving elements of the detection area 62 are shifted from those of the detection area 61 in the X-direction by a distance equivalent of one third of the fundamental period P. The light-receiving elements of the detection area 63 are shifted from those of the detection area 62 in the X-direction by a distance equivalent of one third of the fundamental period P. That is, the detection areas 61 to 64 are arranged so that two neighboring light-receiving units are shifted from each other in the X-direction by a distance equivalent of one third of the fundamental period P so as to be apart from each other in the X-direction. In this case, the distance between the nearest light-receiving elements in the connection part between two neighboring light-receiving units is 4/3C (i.e., 1.3333 . . . C).

According to this configuration, the detection areas 61, 62 and 63 can output an A phase signal (0°), a B phase signal (120°), and a C phase signal (240°), respectively. In this way, it is possible to generate a differential A phase signal (0°) and a differential B phase signal (90°) by combining the three-phase signals and thereby to achieve more accurate position detection.

Other Exemplary Embodiments

Note that the present invention is not limited to the aforementioned exemplary embodiments and may be changed as appropriate without departing from the spirit of the present invention. Although the optical displacement encoder 100 is explained as a transmission-type displacement encoder in the above-described exemplary embodiments, it is merely an example. That is, needless to say, the optical displacement encoder 100 can be constructed as a reflection-type displacement encoder.

Further, in the above-described displacement encoder, an index grating for selecting the order of propagating diffracted light may be disposed between the light source and the scale and/or between the scale and the detection unit. Further, an optical device(s) such as a diffraction grating and a lens for forming an image from diffracted light from the scale may be disposed between the scale and the detection unit.

In the above-described displacement encoder, there is no particular restriction on the distance between the scale and the detection unit. However, when the optical device such as a diffraction grating and a lens for forming an image from diffracted light from the scale is not disposed between the scale and the detection unit, the distance between the scale and the detection unit is preferably such a distance that interference fringes are appropriately formed on the detection unit.

What is claimed is:

1. A displacement encoder comprising:
a scale with an incremental pattern formed therein;
a detection head movable relative to the scale in a measurement direction, the detection head being configured to detect diffracted light and output a detection result, the diffracted light being obtained by diffraction of light emitted to the scale by the incremental pattern; and
a signal processing unit configured to calculate a relative displacement between the scale and the detection head based on the detection result obtained by the detection head, wherein
the detection head comprises:
a light source configured to emit the light to the scale; and
a detection unit comprising a light-receiving unit comprising a plurality of light-receiving elements arranged in the measurement direction, the plurality of light-receiving elements being configured to output a detection signal of the diffracted light from the scale,
the number of the plurality of light-receiving elements arranged in the measurement direction is an even number,
a period of the arrangement of the plurality of light-receiving elements is an odd-number multiple of a fundamental period, the fundamental period being a period of interference fringes formed on the light-receiving unit by +1st order diffracted light and −1st order diffracted light of the diffracted light, and
a width of the light-receiving element in the measurement direction is not equal to an integral multiple of the fundamental period.

2. The displacement encoder according to claim 1, wherein the +1st order diffracted light, −1st order diffracted light, and 0th order diffracted light from the scale are incident on the detection unit.

3. The displacement encoder according to claim 1, wherein
a plurality of light-receiving units are arranged in the measurement direction in the detection unit, and
among the plurality of light-receiving units, two light-receiving units adjacent to each other are shifted from each other by a distance equivalent to a quarter of the fundamental period so as to be apart from each other in the measurement direction.

4. The displacement encoder according to claim 3, wherein
first and second light-receiving units are arranged in this order in the measurement direction in the detection unit, and
the detection unit outputs a detection signal output from the first light-receiving unit to the signal processing unit as an A phase signal and outputs a detection signal output from the second light-receiving unit to the signal processing unit as a B phase signal.

5. The displacement encoder according to claim 3, wherein
first, second, third and fourth light-receiving units are arranged in this order in the measurement direction in the detection unit, and
the detection unit outputs a differential A phase signal and a differential B phase signal to the signal processing unit, the differential A phase signal being a differential signal between an A phase signal and an A− phase signal, the differential B phase signal being a differential signal between a B phase signal and a B− phase signal, the A phase signal being a detection signal output from the first detection unit, the A− phase signal being a detection signal output from the third detection unit, the B phase signal being a detection signal output from the second detection unit, and the B− phase signal being a detection signal output from the fourth detection unit.

6. The displacement encoder according to claim 1, wherein
a plurality of light-receiving units are arranged in the measurement direction in the detection unit, and
among the plurality of light-receiving units, two light-receiving units adjacent to each other are shifted from each other by a distance equivalent to one third of the fundamental period so as to be apart from each other in the measurement direction.

7. The displacement encoder according to claim 6, wherein
first, second and third light-receiving units are arranged in this order in the measurement direction in the detection unit, and
the detection unit outputs a differential A phase signal and a differential B phase signal to the signal processing unit, the differential A phase signal and the differential B phase signal being generated by combining an A phase signal, a B phase signal, and a C phase signal, and having phases different from each other by 90°, the A phase signal being a detection signal output from the first detection unit, the B phase signal being a detection signal output from the second detection unit, and the C phase signal being a detection signal output from the third detection unit.

8. A displacement encoder comprising:
a scale with an incremental pattern formed therein;
a detection head movable relative to the scale in a measurement direction, the detection head being configured to detect diffracted light and output a detection result, the diffracted light being obtained by diffraction of light emitted to the scale by the incremental pattern; and
a signal processor configured to calculate a relative displacement between the scale and the detection head based on the detection result obtained by the detection head, wherein
the detection head comprises:
a light source configured to emit the light to the scale; and
a detector comprising a light-receiver comprising a plurality of light-receiving elements arranged in the measurement direction, the plurality of light-receiving elements being configured to output a detection signal of the diffracted light from the scale,
the number of the plurality of light-receiving elements arranged in the measurement direction is an even number, a period of the arrangement of the plurality of light-receiving elements is an odd-number multiple of a fundamental period, the fundamental period being a period of interference fringes formed on the light-receiver by +1st order diffracted light and −1st order diffracted light of the diffracted light, and a width of the light-receiving element in the measurement direction is not equal to an integral multiple of the fundamental period.

9. The displacement encoder according to claim 8, wherein the +1st order diffracted light, −1st order diffracted light, and 0th order diffracted light from the scale are incident on the detector.

10. The displacement encoder according to claim 8, wherein a plurality of light-receivers are arranged in the measurement direction in the detector, and among the plurality of light-receivers, two light-receivers adjacent to each other are shifted from each other by a distance equivalent to a quarter of the fundamental period so as to be apart from each other in the measurement direction.

11. The displacement encoder according to claim 10, wherein first and second light-receivers are arranged in this order in the measurement direction in the detector, and the detector outputs a detection signal output from the first light-receiver to the signal processor as an A phase signal and outputs a detection signal output from the second light-receiver to the signal processor as a B phase signal.

12. The displacement encoder according to claim 10, wherein first, second, third and fourth light-receivers are arranged in this order in the measurement direction in the detector, and the detector outputs a differential A phase signal and a differential B phase signal to the signal processor, the differential A phase signal being a differential signal between an A phase signal and an A− phase signal, the differential B phase signal being a differential signal between a B phase signal and a B− phase signal, the A phase signal being a detection signal output from the first detector, the A− phase signal being a detection signal output from the third detector, the B phase signal being a detection signal output from the second detector, and the B− phase signal being a detection signal output from the fourth detector.

13. The displacement encoder according to claim 8, wherein a plurality of light-receivers are arranged in the measurement direction in the detector, and among the plurality of light-receivers, two light-receivers adjacent to each other are shifted from each other by a distance equivalent to one third of the fundamental period so as to be apart from each other in the measurement direction.

14. The displacement encoder according to claim 13, wherein first, second and third light-receivers are arranged in this order in the measurement direction in the detector, and the detector outputs a differential A phase signal and a differential B phase signal to the signal processor, the differential A phase signal and the differential B phase signal being generated by combining an A phase signal, a B phase signal, and a C phase signal, and having phases different from each other by 90°, the A phase signal being a detection signal output from the first detector, the B phase signal being a detection signal output from the second detector, and the C phase signal being a detection signal output from the third detector.

* * * * *